June 12, 1928.
L. M. WALDEN
SPOTLIGHT
Filed Feb. 24, 1925
1,673,783
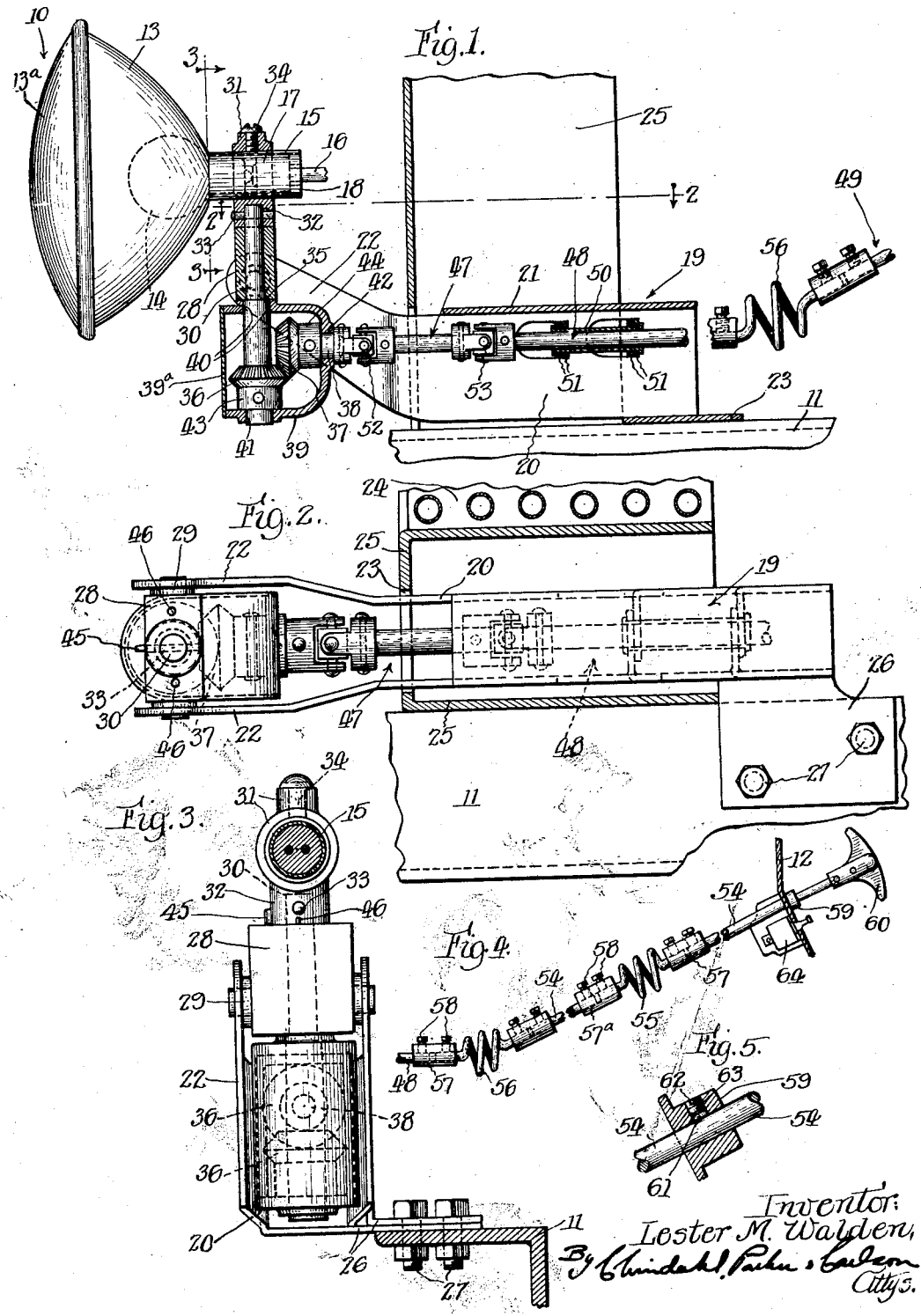
Inventor:
Lester M. Walden,
By Chindahl, Parker & Carlson
Attys.

Patented June 12, 1928.

1,673,783

UNITED STATES PATENT OFFICE.

LESTER M. WALDEN, OF CHICAGO, ILLINOIS.

SPOTLIGHT.

Application filed February 24, 1925. Serial No. 11,015.

My invention relates to dirigible lamps or "spotlights" for motor vehicles and the like and has particular reference to a means for mounting such lamps.

The primary object of the invention is to provide a new and improved mounting for dirigible lamps whereby the lamp may be positioned near the forward end of a vehicle chassis so as to be capable of manual adjustment over a wide range from a remote point of control.

Another object is to provide a means of an advantageous character for mounting spotlights for swingable movement about two perpendicular and intersecting axes, the movement about one axis being effected by rotation of a lamp-carrying shaft which has a beveled gear connection with the actuating mechanism.

Still another object is to provide a spotlight adjustable from a remote point through the medium of a flexible operating rod comprising rigid sections between which is interposed a helically coiled spring.

Other objects and advantages will become apparent from the following detailed description.

In the drawings Figure 1 is a fragmentary side view partially in section showing a spotlight and mounting therefor embodying the features of my invention.

Figure 2 is a fragmentary plan view taken along line 2—2 of Fig. 1.

Fig. 3 is a front view taken along line 3—3 of Fig. 1.

Fig. 4 is a fragmentary elevation of the actuating mechanism.

Fig. 5 is a fragmentary sectional view showing the manner of mounting the actuating rod in a dash board.

In the exemplary embodiment of the invention illustrated in the drawings, 10 designates a dirigible lamp or spotlight mounted on an automobile chassis frame 11 and adapted to be adjusted from a remote point of control such as the dash 12. Lamps of this type usually comprise a reflector casing 13, a lens 13a and a bulb 14.

The reflector casing 13 has a central opening in which is rigidly mounted a rearwardly projecting tube or stem 15 providing at its forward end a socket for the bulb 14. To connect the bulb electrically with lead wires 16, a suitable contact plug 17 is inserted in the tube 15 and held therein by an apertured fibre disk 18.

The means which I have provided for supporting the lamp 10 comprises a member or bracket 19 adapted to be mounted near the forward end of the chassis frame 11 of an automobile. Preferably, the bracket is constructed of two opposite side plates 20 joined together by a rigid top wall 21 and having upwardly inclined forward extensions or arms 22. In the present instance, the bracket is mounted on the chassis frame 11 so as to project a substantial distance through a longitudinal opening 23 in the outer shell 25 of the radiator 24. Such an opening might be specially formed near one vertical edge of any automobile radiator during the process of manufacture. To mount the bracket 19 in the opening 23 the side plates 20 near their rear ends are formed with overlapping lateral extensions 26 which may be rigidly anchored to the frame 11 by bolts 27 preferably at a point just behind the radiator shell 25. Thus the bracket and the operating parts supported therein are concealed in the motor compartment of the automobile.

A bearing block 28 is mounted between the arms 22 on its end trunnions 29 and is thus adapted for pivotal movement about a horizontal axis extending perpendicular to the side walls of the bracket 19. Journaled in the bearing block 28 and extending at right angles to the pivotal axis thereof, is a shaft 30 which carries a clamping ring 31 for supporting the stem 15 of the lamp 10. The clamping ring 31 has a depending portion 32 which is recessed to receive the upper end of the shaft 30 and the ring is rigidly connected to the shaft by a locking pin 33. Suitable means such as the set screw 34 is employed to fasten the lamp stem 15 adjustably in the clamping ring 31. It will be observed that the depending portion 32 bears against the top of the bearing block 28 and thus holds the shaft 30 against downward movement in its journal. To provide a bearing shoulder 35 on the underside of the bearing block 28, the lower portion of the shaft 30 is of an increased size.

Means is provided for rotating the shaft 30 to swing the lamp 10 laterally. For this purpose, a bevel gear 36 rigidly secured to the lower end of the shaft 30 meshes with a bevel gear 37 rigid with the end of a shaft 38. Said shaft 38 is journaled in a housing 39 which also has bearings 40 and 41 on shaft 30. To facilitate assembly and lubrication of the parts the housing 39 is made cup-shaped in form and its open end is closed by a removable plate 39a. The inner faces of the housing surrounding bearing 41 of the shaft 30 and bearing 42 of the shaft 38 abut the gear shanks 43 and 44 respectively and thereby hold the gears 36 and 37 constantly in mash. Thus, the housing 39 is supported on the shaft 30 so that it may be swung about the horizontal axis of the bearing block 28.

From the foregoing it will be apparent that by moving a single element, the gear shaft 38, the lamp 10 may be swung about two intersecting and perpendicular axes. Thus, by rotating the shaft 38, the lamp will be swung laterally from side to side about the axis of the shaft 30. By moving the shaft 38 endwise, the lamp will be tilted up or down, the horizontal axis of the block 28 being the pivotal center for this movement. If desired, the lateral swing of the lamp may be limited by providing an integral lug 45 on the clamping ring 30 in such a position that it will engage upstanding pins 46 on the bearing block 28.

Dual adjustment of the lamp about the intersecting axes is effected, in the present instance, by imparting torsional and axial forces to the gear shaft 38 through an operating rod leading to the remote point of control, in this instance the dash 12. The operating rod preferably is formed in three sections 47, 48 and 49. Section 48 is a rigid rod mounted for rotary and reciprocatory movement in a fixed bearing sleeve 50 which is supported at each of its ends by a pair of apertured lugs 51 cut from the opposed portions of the side plates 20 and bent inwardly in overlapping relation. To provide a suitable flexible connection between the section 48 and shaft 38, operating rod section 47 comprises a rigid rod joined respectively to the rear end of shaft 38 and to the forward end of rod 48 by universals 52 and 53. The construction of the operating rod section 49 constitutes a particular feature of the present invention which will now be described.

To effect rotation and reciprocation of the rod 48 from a point not alined with the axis of the rod, it is essential that a connection be provided which is sufficiently flexible to permit the transmission of proper twisting movement and which, at the same time, has sufficient stiffness to transmit axial forces. For this purpose, I have provided two rigid rod sections 54 connected by means of a flexible universal joint 55 in the form of a helically coiled spring of several turns. A similar joint 56 connects section 49 with section 48 of the operating rod. These coils are formed from wire stock of such size an resiliency as to give the requisite degree of flexibility and stiffness. Flexibility of the rod section 49 will also depend on the length, diameter and compactness of the coil. Both ends of the helical coil 55 are bent into alinement with the coil axis, and each is joined to the rod sections 54 by suitable fittings 57 having opposite end recesses 57a in which the ends of rods 54 and coil 55 are secured by means of set screws 58. In the position shown in Fig. 1, the lower end of the coil 56 extends angularly with respect to the coil axis. The flexible connecting section 49, thus provided affords an efficient means for simultaneously imparting both torsional and axial forces to a shaft from a point not alined with the shaft axis. Obviously this construction is positive and noiseless in operation and inexpensive to manufacture.

The rear end or rod 54 projects through a bearing ring 59 on the dash 12 and is provided with a handle 60 which may be conveniently grasped when the lamp 10 is to be adjusted. To hold the lamp in adjusted position, a fibre disk 61 is held in frictional engagement with the rod 54 by means of a set screw 62 threaded into an opening 63 into bearing ring 59. If desired, the spotlight switch 64 may be attached to the ring 59.

While I have shown in the drawings and described in detail the preferred embodiment of my invention, it should be understood that such disclosure is made merely for the purpose of illustration and that other modifications and variations will probably occur to those skilled in the art. I aim in the appended claims to cover all such modifications and variations.

I claim as my invention:

1. A spotlight having, in combination, a frame, a lamp-carrying shaft rotatably mounted in said frame and adapted for pivotal movement on an axis extending perpendicular to and intersecting its own rotational axis, a second shaft operatively connected to said first mentioned shaft and having its axis extending perpendicular to the pivotal axis and intersecting the rotational axis of said first mentioned shaft, an actuating rod mounted in said frame for movement on a fixed axis, said rod having a flexible connection with said last mentioned shaft whereby torsional and axial forces imparted to the rod will effect rotary and pivotal movement of said first mentioned shaft.

2. A spotlight having, in combination, a frame member, a lamp-carrying shaft mounted on said member to turn on two intersecting axes, a second shaft operatively connected to said first mentioned shaft and extending perpendicular to and intersecting its longitudinal axis, an operating rod mounted in said frame for rotary and reciprocatory movement on a fixed axis, said rod having an operative connection with said last mentioned shaft so that by twisting and reciprocating the rod said first mentioned shaft will be turned on its respective axes.

3. A spotlight having, in combination, a supporting bracket comprising a pair of side plates, a rotatable lamp carrying member mounted between said plates near the forward end thereof, said member being adapted for pivotal movement about an axis perpendicular to said plates, a rod mounted between said plates with its axis extending perpendicular to and positioned substantially below the pivotal axis of said rotatable member, the forward end of said rod having an operative connection with said member, and means for twisting and reciprocating said rod to effect rotatory and pivotal movement of said lamp carrying member.

In testimony whereof, I have hereunto affixed my signature.

LESTER M. WALDEN.